(12) United States Patent
Harmon et al.

(10) Patent No.: US 6,668,370 B1
(45) Date of Patent: Dec. 23, 2003

(54) SYNCHRONOUS EXECUTION OF OBJECT-ORIENTED SCRIPTS AND PROCEDURAL CODE FROM WITHIN AN INTERACTIVE TEST FACILITY

(75) Inventors: Paul Rex Harmon, Cary, NC (US); Tuyet Diem Huynh, Apex, NC (US); Beth Bridgers Lindsey, Fuquay Varina, NC (US); Timothy Wilson, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 09/666,442

(22) Filed: Sep. 21, 2000

(51) Int. Cl.[7] ............................................... G06F 9/44
(52) U.S. Cl. ............................................... 717/125
(58) Field of Search ........................ 717/100, 114–118, 717/120, 124–135; 709/310, 320, 328; 345/744–749, 764

(56) References Cited

U.S. PATENT DOCUMENTS

| | | | |
|---|---|---|---|
| 4,819,234 A | * 4/1989 | Huber | 717/129 |
| 5,093,914 A | * 3/1992 | Coplien et al. | 717/129 |
| 5,179,702 A | 1/1993 | Spix et al. | 395/650 |
| 5,363,501 A | 11/1994 | Pullela | 395/500 |
| 5,475,843 A | 12/1995 | Halviatti et al. | 395/700 |
| 5,611,043 A | 3/1997 | Even et al. | 395/575 |
| 5,671,351 A | 9/1997 | Wild et al. | 385/183.14 |
| 5,805,892 A | 9/1998 | Nakajima | 395/704 |
| 6,094,730 A | * 7/2000 | Lopez et al. | 714/28 |
| 6,105,067 A | * 8/2000 | Batra | 709/227 |
| RE36,852 E | * 9/2000 | Heinen | 395/704 |
| 6,223,202 B1 | * 4/2001 | Bayeh | 709/102 |
| 6,249,907 B1 | * 6/2001 | Carter et al. | 717/129 |
| 6,330,711 B1 | * 12/2001 | Knutson | 717/100 |

* cited by examiner

Primary Examiner—John Chavis
Assistant Examiner—L J Shrader
(74) Attorney, Agent, or Firm—Gregory M. Doudnikoff; Marcia L. Doubet

(57) ABSTRACT

The present invention provides a method, system, and computer program for providing synchronous execution between objects written in an object-oriented programming language and business logic written in a procedural programming language, while executing under control of an interactive test facility for debugging purposes. A single, logical interface is provided during debugging, while actually spanning multiple programming models based on different technologies. Using the present invention, the developer is able to debug both the object-oriented user interface part and the procedural business logic part of an application as the code executes in an integrated manner.

24 Claims, 11 Drawing Sheets

FIG. 6B

```
☐ CustomerUpdateGUI - Script Editor                                    _ ☐ ☒

File  Edit  View  Class  Categories  Methods  Info  Breakpoints  Help

┌─────────────────────┐  ┌──────────────┐        ┌──── 655 ────┐
│ Object Scripts      │  │ displayError │    ◄ ├─────────┤ ►       ▲  ▲
│                     │  │              │                         │  │
│                     │  │              │                         │  │
│                     │  │              │                         │  s
│                     │  │              │                         │  o
│                     │  │              │                         │  u
│                     │  │              │                         │  r
│                     │  │              │                         │  c
│                     │  │              │                         │  e
│                     │  ├──────────────┤                         │
│                     │  │ instance     │  public                 │
└─────────────────────┘  └──────────────┘                         │ displayError
 "Set in-error field's background to red, invoke message prompter"
 | fieldInError messageText | fieldInError:=(self subpartNamed:='CUSTOMER') abtAtAttribute: #'FIELD data'.  660
 messageText:= (self subpartNamed: 'CUSTOMER') abtAtAttribute: #'MESSAGE data'.  665

(self subpartNamed: fieldInError) backgroundColor:'red'.  670
 (self subpartNamed: 'Message Prompter1') messageString: messageText.  675
 (self subpartNamed: 'Message Prompter1') prompt.  680
                                                                  ▼  ▼

(3/13/00 12:01:47 PM) from BethGuiTestApp in 'Object Scripts'
```

SYNCHRONOUS EXECUTION OF OBJECT-ORIENTED SCRIPTS AND PROCEDURAL CODE FROM WITHIN AN INTERACTIVE TEST FACILITY

RELATED INVENTIONS

The present invention is related to IBM applications having Ser. No. 09/666,849 entitled "Blending Object-Oriented Objects with Traditional Programming Languages" (hereinafter referred to as the "first related invention") and Ser. No. 09/667,153 entitled "Manipulation of an Object-Oriented User Interface Process to Provide Rollback of Object-Oriented Scripts from a Procedural Business Logic Debugger" (hereinafter referred to as the "second related invention"), which were filed concurrently herewith and are hereby incorporated herein by reference.

BACKGROUND OF THE INVENTION

1. Field of the Invention

The present invention relates to computer software, and deals more particularly with a method, system, and computer program product for providing synchronous execution between objects written in an object-oriented programming language and business logic written in a procedural programming language, while executing under control of an interactive test facility for debugging purposes.

2. Description of the Related Art

Testing is an important part of the software development cycle. The motivation for testing software is to raise the quality and reliability of the program, and to establish confidence that the program does what it is supposed to do. Assuming that programs contain errors, the purpose of testing is to find as many of the errors as possible. Thus, testing may be considered as the process of executing a program with the intent of finding errors.

Many interactive test facilities, or "test debuggers", provide features that allow users to animate (i.e. display, and step through the logic of) the business logic which is invoked by graphical user interface (GUI) applications, where that business logic is often written in a procedural programming language. This is typically done using an event-driven facility which knows how to become active when a specific event from the graphical user interface causes invocation of a business logic code component. When the GUI event is triggered, a debugger for procedural code is invoked. A window (referred to herein as a "test monitor window") is then displayed to enable the developer to interact with and control the business logic debugging. However, existing test facilities do not typically allow the user to go back and forth between the business logic itself and object-oriented (OO) methods (referred to equivalently herein as OO scripts) which more directly manipulate the OO objects used by the business logic. That is, once the test facility is animating the procedural business logic which was invoked by the GUI event, processing control remains in that procedural aspect of the test facility until the invoked business logic completes.

The problem with this prior art approach is that the business logic code often needs to directly interact with the OO methods as the business logic executes, rather than awaiting completion of the invoked business logic, such that the two parts of the system (i.e. the GUI part and the business logic part) can execute in an integrated manner. For example, suppose the business logic performs analysis or error checking of data values which an eventual application user will enter into the fields of a user interface panel. Further suppose that this analysis code is designed to display an error message window, at run-time, upon detecting a problem with any of the input data values. Preferably, each detected error would be displayed as it is detected. If the debugger does not return control to the GUI context until all of the business logic corresponding to the invoked GUI event has completed, the error message window will not be displayed at the most appropriate time (and any related OO logic will not execute in-line, before other business logic data processing occurs). This delay between detecting an error and presenting it on the GUI, while control is forced to remain in the business logic being debugged until that code completely finishes, leads to an unnatural, inefficient reflection of the results of the business logic's processing on the user interface. When this happens, it is much more difficult for the developer to accurately debug the application.

This situation is exacerbated if multiple error messages are generated while stepping through the business logic. Suppose, in this same example, that the application allows the user to enter values of several fields into the GUI before invoking the business logic which analyzes each field value. (This approach may be necessary, for example, when the value of one field dictates the allowable values of another field.) Because the error messages are not presented upon detection, the developer must provide a means for saving each generated message until all the analysis code completes, and a means for then displaying each message in sequence (preferably, in order of the business logic processing). This may be done, for example, by creating a collection or table of error messages as the procedural analysis code executes, and then iteratively processing each saved element of the created structure in the GUI code for display to the user when the analysis code is complete. However, this approach is quite cumbersome and is therefore undesirable.

Alternatively, the developer may be forced to redesign the procedural code to avoid this situation (e.g. by attempting to break the business logic into smaller components, enabling control to return to the GUI more often). This is an undesirable solution, as it makes the coding task more difficult and yields an application design which is oriented toward easier debugging and easier message display, rather than toward the problem being solved by a particular application.

Accordingly, what is needed is a technique for providing seamless debugging of object-oriented methods and procedural language code components which are intended to execute in an integrated manner, where control efficiently passes from one to the other and avoids the problems of prior art debugging facilities. This seamless operation must be provided even though the methods and procedural components may be executing in different processes, different namespaces, and/or different software products.

SUMMARY OF THE INVENTION

An object of the present invention is to provide a technique for synchronous execution between objects written in an object-oriented programming language and business logic written in a procedural programming language, while executing under control of an interactive test facility for debugging purposes.

A further object of the present invention is to provide a technique for seamless debugging of object-oriented methods and procedural language code components which are intended to execute in an integrated manner.

Another object of the present invention is to provide this technique whereby control efficiently passes back and forth between object-oriented code execution and procedural language code execution.

Yet another object of the present invention is to provide this technique even though the methods and procedural components may be executing in different processes, different namespaces, and/or different software products.

Still another object of the present invention is to provide a technique for sharing data values among methods and procedural components which may be executing in different processes, different namespaces, and/or different software products.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer program product for providing synchronous execution between objects written in an object-oriented programming language and business logic written in a procedural programming language, while executing under control of an interactive test facility for debugging purposes. This technique comprises: providing one or more object-oriented methods written in the object-oriented programming language; providing one or more procedural components written in the procedural programming language, wherein at least one of the procedural components contains one or more references to selected ones of the object-oriented methods; selecting, by a user of the interactive test facility, an event from a graphical user interface, wherein the event is operably associated with a selected one of the procedural components; executing the selected procedural component under control of a procedural debugger of the interactive test facility, responsive to the event selection; transferring control from the procedural debugger to a particular one of the object-oriented methods upon encountering one of the references in the executing procedural component, wherein the encountered references identifies that particular one, executing the particular object-oriented method; and returning control to the procedural debugger upon completion of the execution of the particular object-oriented method.

The technique preferably further comprises performing a first synchronization of data values prior to the transferring of control, and performing a second synchronization of data values prior to the returning of control.

The procedural debugger and the object-oriented method may operate in different processes, different namespaces, and/or in different software products.

The technique may further comprise invoking an object-oriented debugger during the execution of the particular object-oriented method, and wherein this object-oriented debugger takes over control of the execution of the particular object-oriented method after the invocation. In this case, the interactive test facility and the object-oriented debugger may be written in different programming languages.

The present invention will now be described with reference to the following drawings, in which like reference numbers denote the same element throughout.

BRIEF DESCRIPTION OF THE DRAWINGS

FIGS. 6A–6B illustrate sample code fragments that will be used to describe operation of the present invention.

DESCRIPTION OF THE PREFERRED EMBODIMENT

Figure 1:
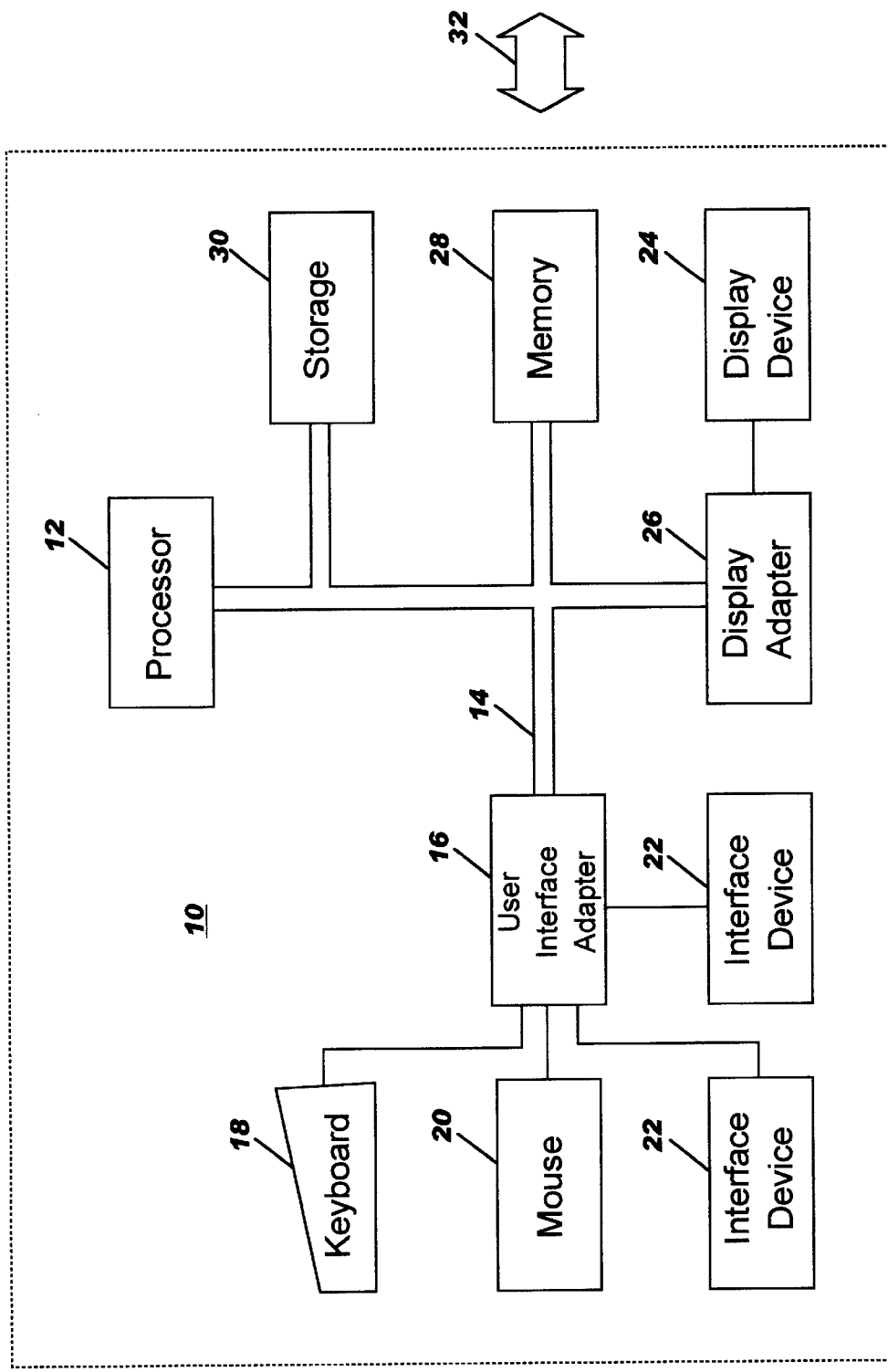
FIG. 1 is a block diagram of a computer workstation environment in which the present invention may be practiced.

FIG. 1 illustrates a representative workstation hardware environment in which the present invention may be practiced. The environment of FIG. 1 comprises a representative computer or intelligent workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

Software programming code which embodies the present invention is typically accessed by the microprocessor 12 of the workstation 10 from long-term storage media 30 of some type, such as a CD-ROM drive or hard drive. In a client-server networking environment (not shown), such software programming code may be stored with storage associated with a server. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

In the preferred embodiment, the present invention is implemented as objects (classes and methods) in an object-oriented programming language such as Smalltalk or Java™. ("Java" is a trademark of Sun Microsystems, Inc.) The present invention has been implemented in the Interactive Test Facility component of the IBM VisualAge® Generator Developer for OS/2® and Windows NTS® 4.0, which are optional features of the VisualAge® for Java™ and VisualAge® for Smalltalk products which are available from the International Business Machines Corporation ("IBM"). (VisualAge is a registered trademark of IBM, and Java is a trademark of Sun Microsystems, Inc.) However, the inventive concepts disclosed herein may be used advantageously with other products and with other programming languages, whether implemented in object-oriented or procedural languages.

The present invention provides an interactive debugging environment which presents a single, logical interface while actually spanning multiple separate programming models which are based on different technologies. Further, these programming models may operate in different execution contexts and different namespaces, and may be provided by distinct software products.

The preferred embodiment of the present invention will now be discussed with reference to FIGS. 2 through 8.

Figure 2A:
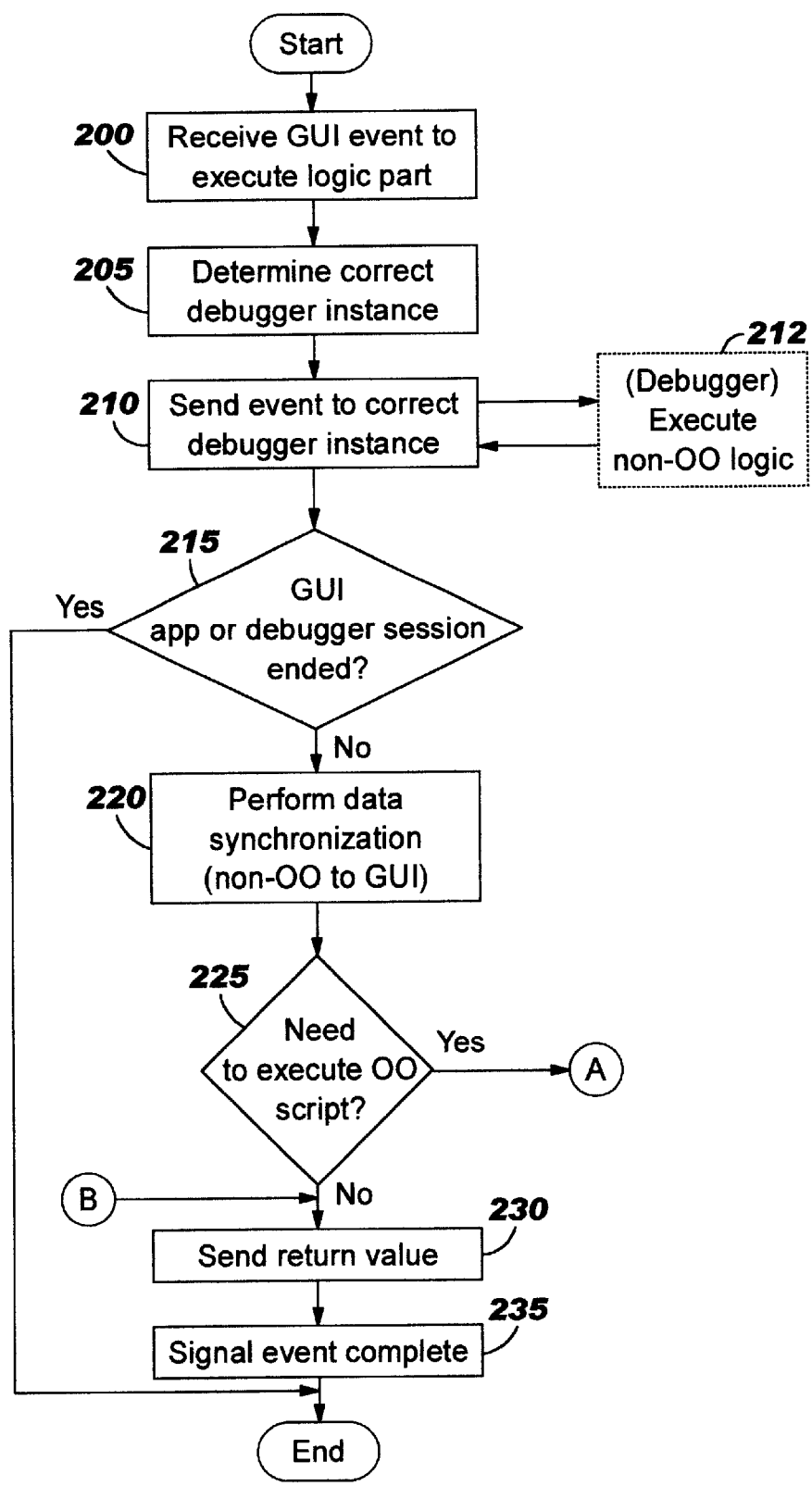
FIGS. 2–5 illustrate flowcharts depicting logic that may be used to implement a preferred embodiment of the present invention.
Figure 2B:
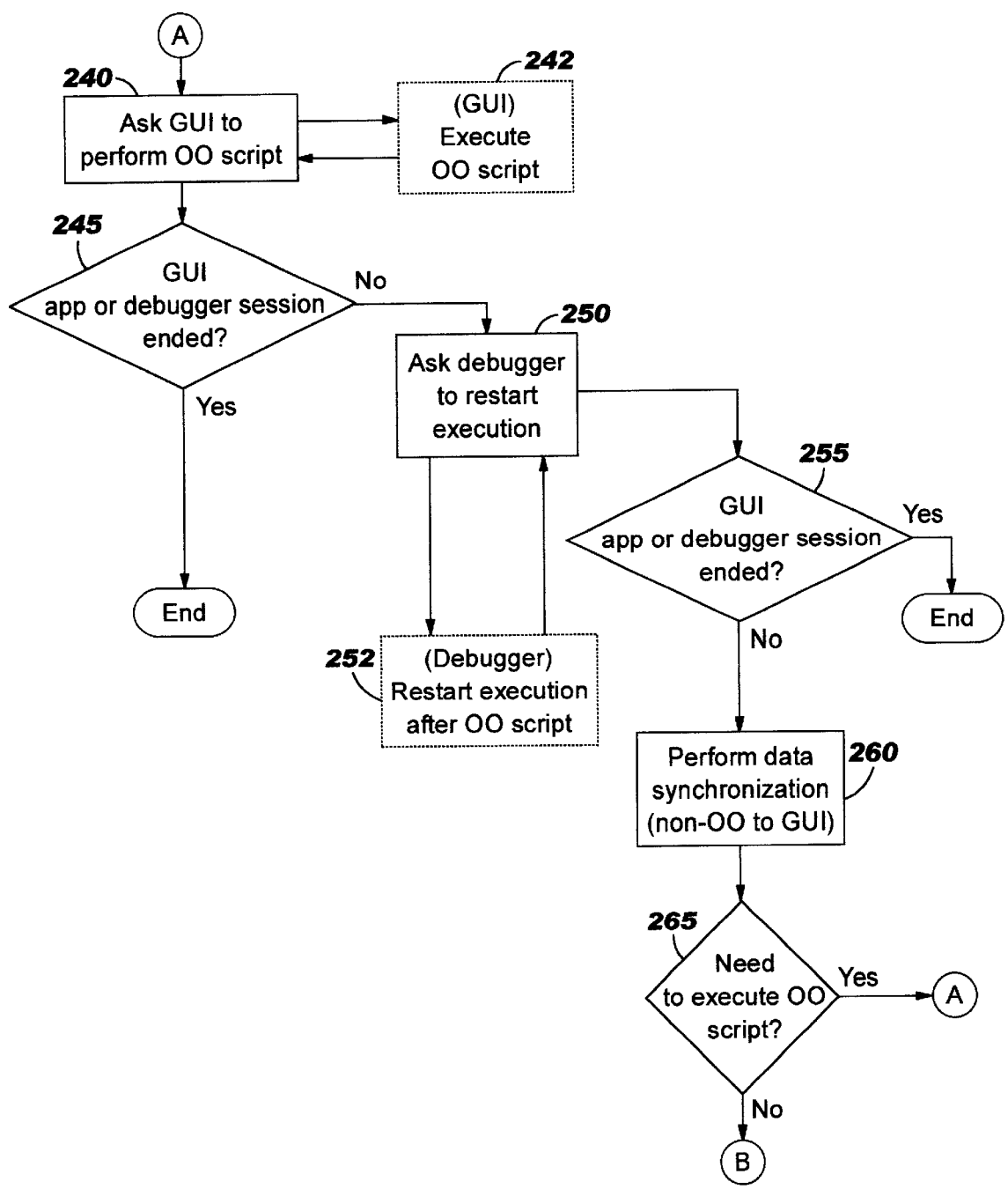
Figure 3:
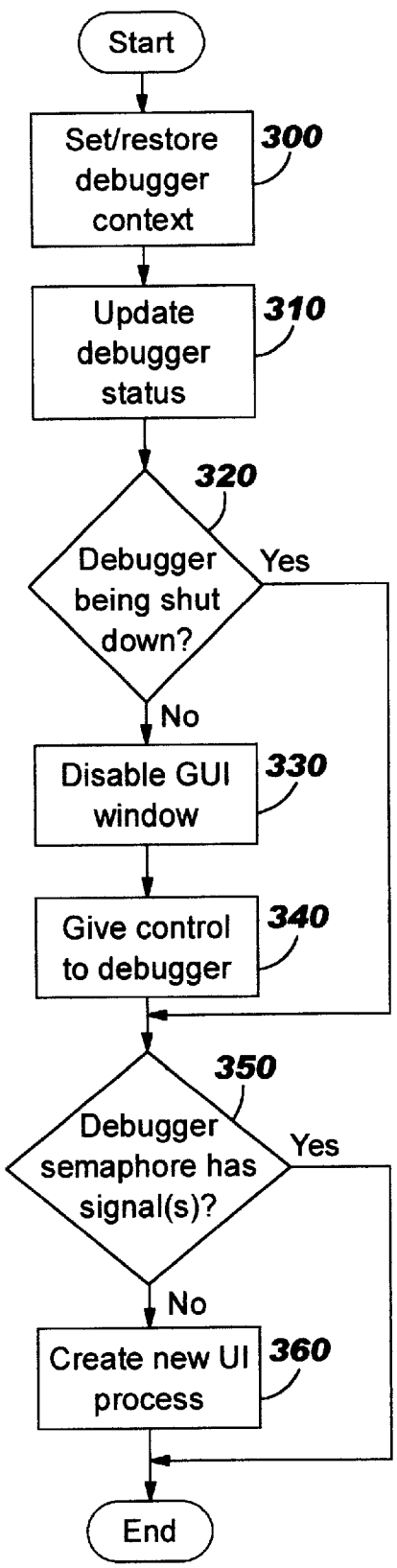
Figure 4:
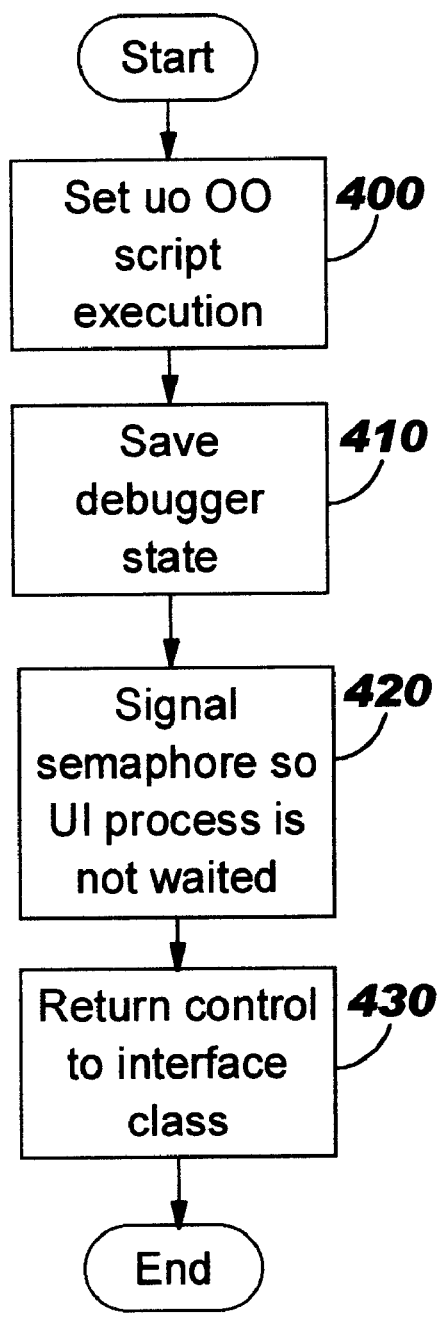

FIG. 2 (comprising FIGS. 2A and 2B) depicts the logic that may be used to implement a preferred embodiment of the present invention, and FIGS. 3–5 then provide more detailed information. This logic is invoked when the developer selects a GUI event (e.g by clicking on an icon, such as icon 701 of FIG. 7) corresponding to execution of a procedural logic component (referred to equivalently herein as a "logic part") from the user interface, and begins at Block 200 where this invoked event is received. The correct instance of the debugger in which to execute this event is determined (Block 205). If there is an existing instance which is free and therefore available, then Block 205 may reuse this instance, according to techniques which are well known in the art; otherwise, a new instance (and an associated test monitor window for that instance) is created. The event and the GUI context are then sent to that instance (Block 210).

The debugger instance then receives control. After preparing the debugger instance for execution of the procedural business logic (as further described below with reference to FIG. 3), the debugger instance then executes the procedural logic as indicated at Block 212 while the mainline execution flow of FIG. 2 (and processing in the GUI context) is halted. In the preferred embodiment of the present invention, an interface class is used to handle switching control between the GUI context and the procedural debugger context. Thus, a method of this class is invoked when control transfers from Block 210 to Block 212, passing an identification of the invoking GUI context as a parameter. When used with a debugger implemented in Smalltalk and a GUI implemented in Smalltalk, this interface class and the debugger classes are preferably contained within the same Smalltalk image as the GUI. When used with a debugger implemented in Smalltalk and a GUI implemented in Java, a portion of the interface class and the debugger classes are preferably contained within the same Smalltalk image, while another portion of the interface class and the GUI classes are preferably contained within the same Java image. In this latter case, the classes of the interface manipulate both Smalltalk processes and Java processes.

Figure 8:
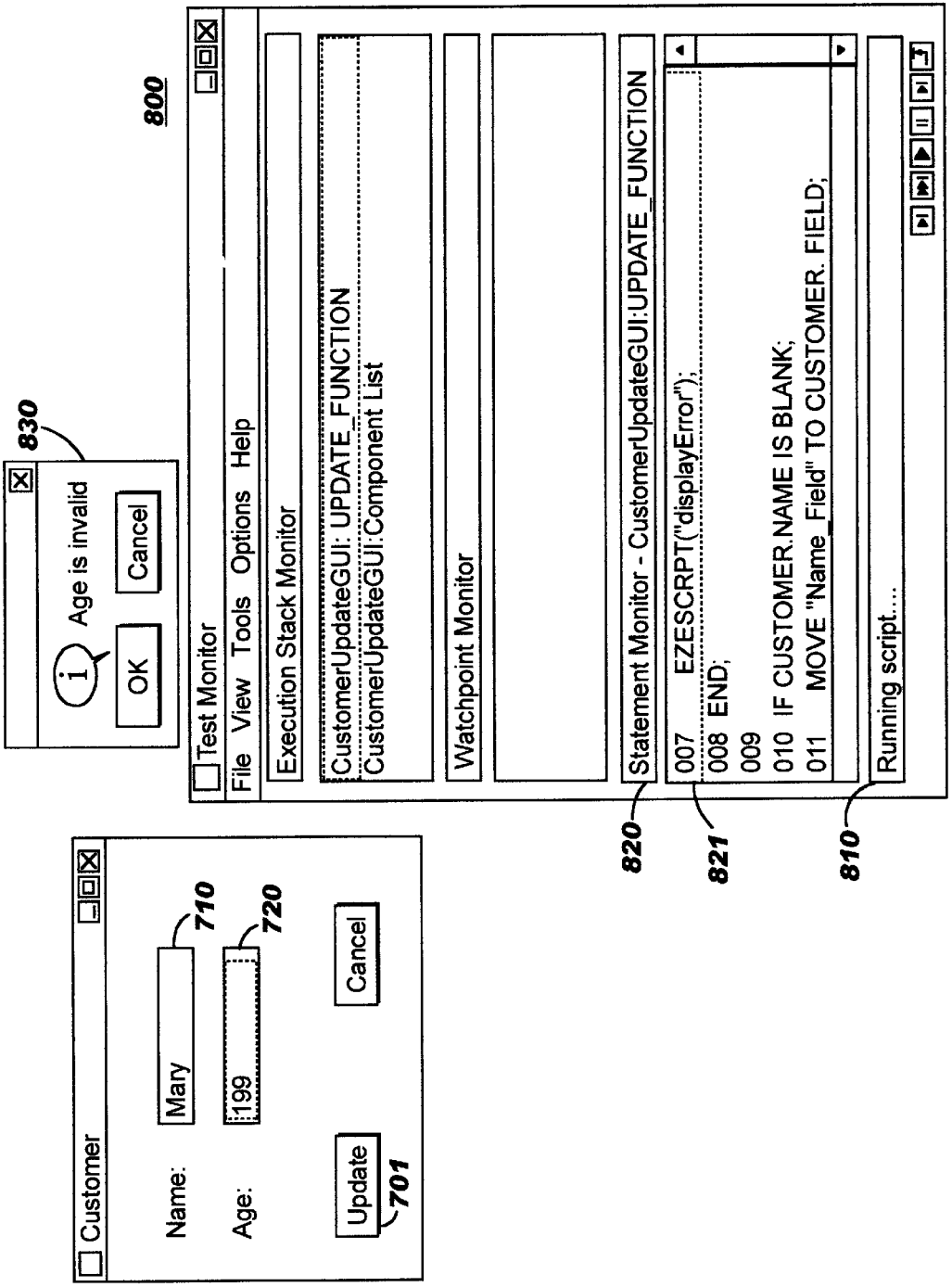

Preferably, a debug window such as window 800 of FIG. 8 is displayed as the debugger instance receives control, enabling the developer to view and control the executing procedural business logic. The procedural logic is executed by the debugger using techniques which are known in the art, and which do not form part of the present invention.

Control returns from Block 212 to Block 210 when either (1) the procedural logic has completed, or the GUI application or debugger session has been ended, or (2) the procedural logic has encountered an invocation of OO code. As described in the first related invention, the procedural logic may invoke OO code through a special keyword construct, which in the preferred embodiment uses the syntax "EZESCRPT (method-name)", where an actual method name is substituted for the method-name parameter. Block 215 then checks to see if control was returned because the GUI application or debugger session has ended, as in case (1) above. If so, then the process of using the present invention is complete, and traversal through the logic of FIG. 2 ends. Otherwise, processing continues at Block 220.

Block 220 performs a synchronization of data between the procedural and the OO logic. Because these two parts of the overall system are executing in different namespaces, their data values are separately stored. However, to present an integrated picture to the user of the application, it is necessary to update the copy of the data values maintained by one side after they are changed by the other side, to enable sharing data between the separate copies maintained by the procedural and the OO logic. Accordingly, any changes to data values that were made in the procedural logic's copy must now be copied over to the OO logic's copy, such that Block 220 performs a refresh of the data values accessible to the OO logic. Standard interface techniques which have been developed in the prior art are used for this purpose, whereby the OO logic knows the location of the procedural language data, and accesses that data to make a local copy of the values stored therein.

Block 225 then checks to see if there is an OO script to execute. (As used herein, the term "OO script" comprises an OO method.) If not, then Block 230 sends the return value of the procedural logic which was invoked in Block 200, and Block 235 then signals that the invoked event is complete, thereby returning control to the GUI and enabling any triggered OO events to run or allowing the developer to select a subsequent GUI event. The processing of FIG. 2 then ends for the current invocation.

When Block 225 has a positive result, control transfers to Block 240 of FIG. 2B, where the GUI context is asked to perform the OO script. The mainline processing of FIG. 2 (and the processing of the procedural debugger) halts while the GUI executes this OO script (Block 242). The OO script must be executed in the original UI (user interface) process from which the business logic code was invoked. FIG. 4, described below, describes the processing used in the preferred embodiment to prepare for the OO script execution. As control transfers from Block 240 to Block 242, the interface class of the preferred embodiment switches control from the procedural debugger context to the GUI context.

The OO script may invoke a procedural logic component as it executes (as will be described below, with reference to the example in FIG. 6B). In this case, a recursive invocation of the logic of FIG. 2 is performed from Block 242, beginning at Block 200 of FIG. 2A. Upon completion of the recursive invocation, control returns to Block 242 to complete the processing of the OO script from which the recursive invocation occurred.

Upon returning from Block 242, either (1) the OO script has completed, or (2) the GUI application or debugger session has been ended. Block 245 asks if it is the latter case. If so, then processing for this invocation of the present invention is complete. Otherwise, control transfers to Block 250 which asks the debugger to restart execution of the procedural code. As control transfers from Block 250 to Block 252, the interface class of the preferred embodiment switches control from the GUI context back to procedural debugger context.

Figure 5A:
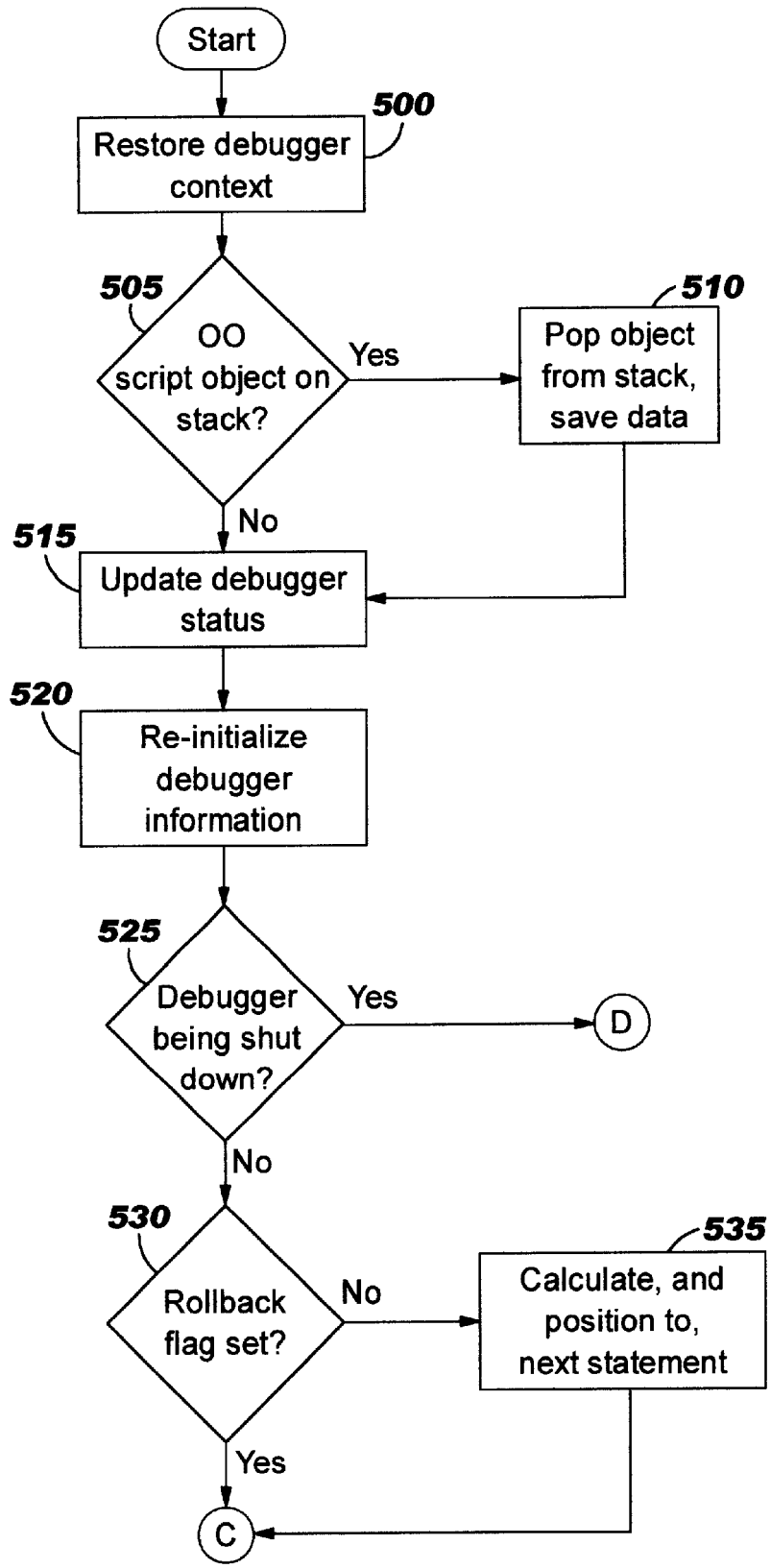
Figure 5B:
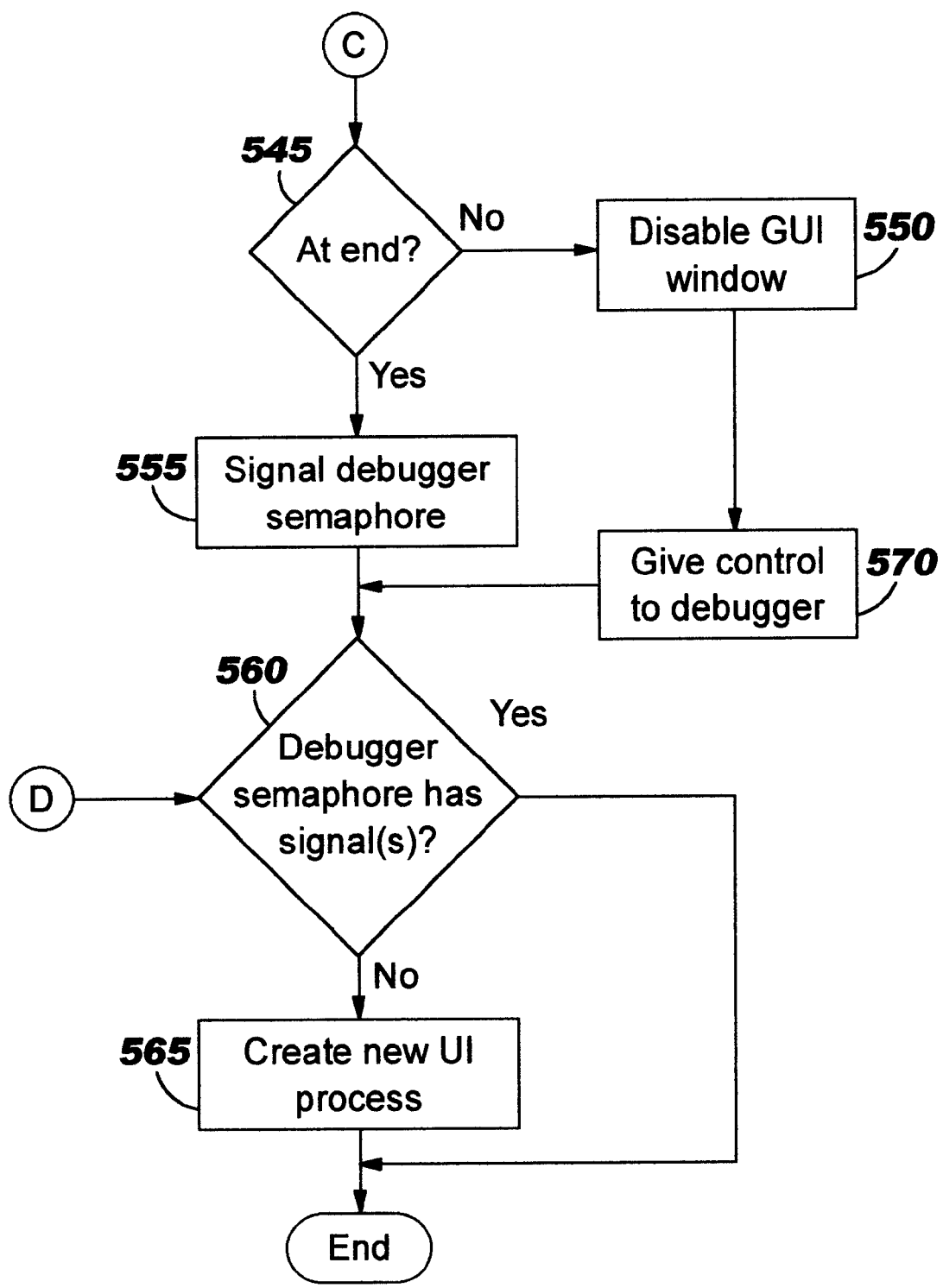

Upon completion of the OO script execution, control must be returned to the procedural language debugger so that the procedural code can restart from the statement after the script invocation which was detected by Block 225. As indicated in Block 252, this restart is to occur from the next procedural statement after the OO script invocation which ended the debugger's previous processing in Block 212. FIG. 5 (comprising FIGS. 5A and 5B), described below, describes the processing used in the preferred embodiment to prepare for returning to operation of the debugger.

As described above with reference to Block 212, the debugger may return control to the mainline processing of FIG. 2 because the procedural logic is complete or the processing has otherwise ended, or because another OO script invocation has been encountered. Block 255 thus checks to see why control has returned. If it is because processing has ended, then traversal through the logic of FIG. 2 is complete. Otherwise, control transfers to Block 260. Block 260 performs synchronization of data values that have been changed in an analogous manner to that above for Block 220. Block 265 then checks to see whether there is another OO script invocation to be processed. If so, control returns to Block 240 of FIG. 2B; otherwise, control returns to Block 230 of FIG. 2A to finish the processing of the procedural logic invocation.

FIG. 3 depicts the logic used in the preferred embodiment to prepare for execution of the procedural debugger when a business logic event has been selected from the GUI, or invoked from OO code executing in the GUI context. As shown at Block 300, the debugger context must be set (if this is the first invocation) or restored. For the first invocation, this comprises initializing global variables that are to be used by the debugger instance to default values. On subsequent invocations, this comprises obtaining the values of any global variables that were in effect (and were stored, as will be described with reference to FIG. 4) when this debugger instance last had control, before giving control to a UI process to run an OO script.

Optionally, a debugger status stack may then be updated (Block 310), where this stack is used to display a status line on the test monitor window (such as status line 810 of FIG. 8) to inform the developer of the current debugger status. This update comprises popping any status events which are related to OO script execution off the top of the stack, if any are present, thereby restoring it to reflect a procedural code debugging status. The status line is then revised to reflect this status information.

At Block 320, a test is made as to whether this debugger instance is being shut down. If so, then control transfers to Block 350. Otherwise, Block 330 disables the GUI window. This prevents new user interface events from being fired while the procedural code executes, thereby enabling the developer to maintain focus on debugging the business logic corresponding to the event which was selected when the processing of FIG. 2 was invoked. (In the preferred embodiment, this is accomplished by invoking a "sensitive: false" method for the components, or parts, of the window.) Block 340 then gives control to the debugger.

Block 350 checks to see if there are any semaphores signaled for the debugger. Semaphores may have been signaled in a number of situations, including: (1) an OO script has run to completion; (2) an OO script has halted due to encountering a statement, which according to the first related invention, has the syntax "EZECLOS" (and which functions in the same manner as a conventional "return" statement in procedural programming); (3) the GUI client window or test monitor was shut down; (4) an EZESCRPT statement was encountered; (5) the debugger is returning from a logic event caused by an OO script; or (6) the current debug statement pointer is being repositioned, according to the second related invention. If there are no signals, then Block 360 forks off another UI process, causing the existing UI process to become halted. This new UI process will be used to handle any developer interactions with the test monitor window. If there are signals, then the existing UI process is not halted. Instead, the existing UI process is used for running the procedural debugger. Following operation of Block 360 and a positive result in Block 350, the processing of FIG. 3 ends.

FIG. 4 depicts a preferred embodiment of the logic used to prepare for executing an OO script which is referenced from an executing procedural language component. When the procedural logic debugger encounters a synchronous call back to an OO script in the GUI, the debugger must set up to save its state before returning control to the GUI context. The executing OO script may manipulate various user interface elements, and as stated above, may also trigger an event that causes another business logic code component to run (which would bring up another test monitor window, using a recursive invocation of the logic of FIG. 2).

This process begins at Block 400, which sets up necessary information about what OO script should be executed, using the parameter name from the script invocation. Block 410 then saves the state information for the debugger, including its execution stack, the values of any global variables which are being used, and the current statement pointer. Block 420 signals a semaphore which was previously set to block execution of the UI process, so as not to wait that process. Control is returned to the interface class (Block 430). When the interface class is used with a Smalltalk GUI and a Smalltalk debugger, then the correct UI process will already be in control when the GUI begins execution. When the interface class is used with a Java GUI and a Smalltalk debugger, however, then the correct UI process must be identified to the interface class before returning control. This comprises passing the interface class an identifier of the UI process from which the debugger was invoked. The processing of FIG. 4 is then complete.

FIG. 5 depicts the logic used in the preferred embodiment to prepare for returning to operation of the procedural language debugger when an invoked OO script has either (1) completed or (2) invoked either the same or a different procedural language component. At Block 500, the debugger context must be restored, as has been described above with reference to Block 300.

Block 505 asks whether there is an OO script object on an internal OO script stack. If so, then Block 510 pops this object from the stack, as the OO script has completed, and saves from this object the rolling back flag (which is used by the second related invention) and the identification of the procedural language component from which the OO script was invoked.

Optionally, a debugger status stack may be updated (Block 515). As described with reference to Block 310 of FIG. 3, this update comprises popping any status events which are related to OO script execution off the top of the stack, if there are any, thereby restoring it to reflect a procedural code debugging status. The status line is then revised to reflect this status information.

Block 520 re-initializes what is required for the debugger to run procedural language code.

At Block 525, a test is made as to whether this debugger instance is being shut down. If so, then control transfers to Block 560. Otherwise, Block 530 asks whether the rollback flag (used by the second related invention) is set. If it is not, then Block 535 determines the next statement to be executed, and positions the debugger to that statement, by updating the debugger's internal stack to point to the next statement following the EZESCRPT statement which has just been processed. If the rollback flag is set, then the next statement has been explicitly indicated by the developer, so the processing of Block 535 is bypassed.

Block 545 asks whether execution of the procedural language component is complete. This is the case, for example, when the EZESCRPT statement is the final statement in the procedural component. If execution is not complete, then Block 550 disables the GUI window (as discussed above with reference to Block 330 of FIG. 3), after which Block 570 gives control to the debugger instance. Otherwise, when Block 545 has a positive result, Block 555 signals a semaphore used for the debugger.

Block 560 asks whether there are any semaphores signaled for the debugger (as has been described with reference to Block 350 of FIG. 3). If not, then Block 565 forks off another UI process, causing the UI process in which the GUI was executing to become halted. This new UI process will be used to handle any developer interactions with the test monitor window. If there are signals, then the existing UI process is not halted, but will instead be used for running the debugger instance. Following operation of Block 565 and a positive result in Block 560, processing of FIG. 5 then ends.

Figure 6A:
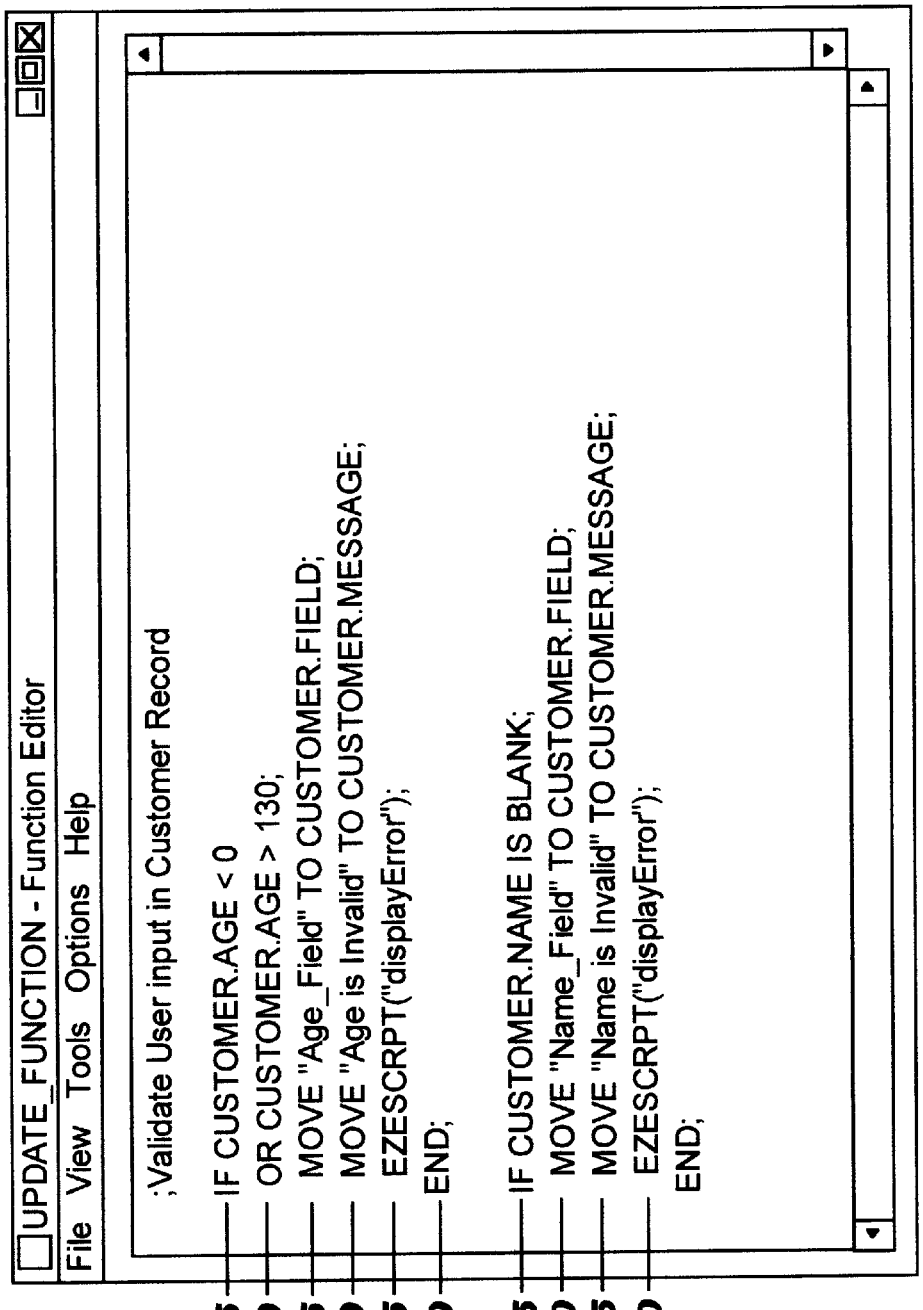

FIGS. 6A–6B illustrate example code fragments that will be used to describe the process of debugging an application with the present invention. In FIG. 6A, a first procedural code component 600 (written in a COBOL-like programming syntax) analyzes data values entered into fields of a customer record, for example by using a GUI display such as element 700 of FIG. 7. By inspection, it can be seen that programming statements 605, 610 test lower and upper bounds on a customer's age. If an error is detected according to these bounds, statements 615 and 620 initialize fields to be used in an error message according to the first related invention. Statement 625 then causes the OO method "displayError" to be invoked in the GUI context. This method is depicted in the example of FIG. 6B. Programming statement 635 continues the procedural language component, upon returning from the displayError method (or when no error was detected, and the method invocation was bypassed), by performing an analysis of the customer name field. If the name has been left blank, statements 640 and 645 initialize an appropriate error message, and statement 650 again invokes the displayError method.

In FIG. 6B, the OO code 655 for an example displayError method is shown. Statements 660 and 665 obtain the identification of the field in error, and the text of the error message, the values of which have been set in the procedural code (and which are shared between that procedural code and the OO code, according to the first related invention). Statement 670 then changes the background color of the field which is in error to red. Statements 675 and 680 display an error message prompt and wait for the user to respond to the message, after which control will return (in this example) to statement 630 of the procedural code component 600. Note that the OO script might also have contained an invocation of a procedural language component (either the same component 600 of FIG. 6A, or a different code component), where that code component may have had its own OO script invocation(s). In this situation, the logic of FIG. 2 is invoked anew for the procedural component, as has been described.

Figure 7:
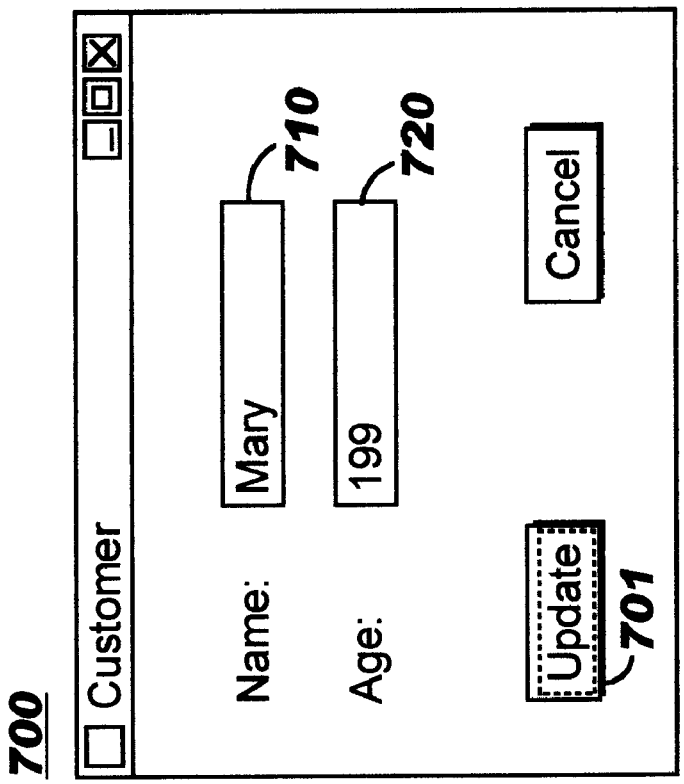
FIGS. 7–8 depict sample windows that may be displayed during operation of a preferred embodiment of the present invention.

FIG. 7 depicts an example GUI screen 700 from which a procedural language component such as element 600 of FIG. 6A can be invoked, for example by clicking on icon 701 after entering data into fields 710 and 720. FIG. 8 illustrates an example of a test monitor window 800 that may be used with the present invention, as well as the error message prompt 830 which is used to notify the application user of an error in the input data (in this case, the data in field 720). Note that the statement monitor area 820 of the test monitor window 800 shows the individual statements of the procedural language component (in this example, component 600 of FIG. 6A), and by highlighting 821 indicates that the OO script invocation is the statement currently being executed.

Thus, it can be seen from the descriptions above (with reference to the simple example of FIGS. 6–8) that OO script processing is invoked in-line according to the present invention, enabling OO scripts and procedural code to execute during debugging in a synchronous manner.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. A computer program product for providing synchronous execution between objects written in an object-oriented programming language and business logic written in a procedural programming language while executing under control of an interactive test facility for debugging purposes, said computer program product embodied on a computer-readable medium and comprising:

computer-readable program code means for selecting, by a user of said interactive test facility while executing a first object-oriented method written in said object-oriented language, an event from a graphical user interface, wherein said event is operably associated with a selected one of one or more procedural components written in said procedural programming language, wherein said selected procedural component contains an invocation of a second object-oriented method written in said object-oriented programming language; and computer-readable program code means for enabling synchronous execution of said selected procedural component, under control of a procedural debugger of said interactive test facility, and said second object-oriented method.

2. The computer program product according to claim 1, wherein said computer-readable program code means for enabling synchronous execution further comprises:

computer-readable program code means for first transferring control from said first object-oriented method to said selected procedural component, responsive to said computer-readable program code means for selecting;

computer-readable program code means for executing said selected procedural component under control of said procedural debugger, responsive to said computer-readable program code means for first transferring control;

computer-readable program code means for next transferring control from said procedural debugger to said second object-oriented method upon encountering said invocation during execution of said selected procedural component;

computer-readable program code means for executing said second object-oriented method, responsive to said computer-readable program code means for next transferring control; and computer-readable program code means for returning control from said second object-oriented method to said procedural debugger upon completion of said execution of said second object-oriented method.

3. The computer program product according to claim 2, further comprising:

computer-readable program code means for performing a first synchronization of data values prior to operation of said computer-readable program code means for next transferring control, thereby enabling data values changed by said computer-readable program code means for executing said selected procedural component to be shared with said second object-oriented method; and computer-readable program code means for performing a second synchronization of data values prior to operation of said computer-readable program code means for returning control, thereby enabling data values changed by said computer-readable program code means for executing said second object-oriented method to be shared with said selected procedural component.

4. The computer program product according to claim 3, wherein said procedural debugger and said object-oriented method operate in different namespaces.

5. The computer program product according to claim 3, wherein said procedural debugger and said object-oriented method operate in different processes.

6. The computer program product according to claim 3, wherein said procedural debugger and said object-oriented method operate in different software products.

7. The computer program product according to claim 2, wherein said computer-readable program code means for executing said second object-oriented method further comprises computer-readable program code means for executing said second object-oriented method under control of an object-oriented debugger.

8. The computer program product according to claim 7, wherein said interactive test facility and said object-oriented debugger are written in different programming languages.

9. A system for providing synchronous execution between objects written in an object-oriented programming language and business logic written in a procedural programming language while executing under control of an interactive test facility for debugging purposes, said system comprising:

means for selecting, by a user of said interactive test facility while executing a first object-oriented method written in said object-oriented language, an event from a graphical user interface, wherein said event is operably associated with a selected one of one or more procedural components written in said procedural programming language, wherein said selected procedural component contains an invocation of a second object-oriented method written in said object-oriented programming language; and means for enabling synchronous execution of said selected procedural component, under control of a procedural debugger of said interactive test facility, and said second object-oriented method.

10. The system according to claim 9, wherein said means for enabling synchronous execution further comprises:

means for first transferring control from said first object-oriented method to said selected procedural component, responsive to said means for selecting;

means for executing said selected procedural component under control of said procedural debugger, responsive to said means for first transferring control;

means for next transferring control from said procedural debugger to said second object-oriented method upon encountering said invocation during execution of said selected procedural component;

means for executing said second object-oriented method, responsive to said means for next transferring control; and means for returning control from said second object-oriented method to said procedural debugger upon completion of said execution of said second object-oriented method.

11. The system according to claim 10, further comprising:

means for performing a first synchronization of data values prior to operation of said means for transferring control, thereby enabling data values changed by said means for executing said selected procedural component to be shared with said second object-oriented method; and means for performing a second synchronization of data values prior to operation of said means for returning control, thereby enabling data values changed by said means for executing said second object-oriented method to be shared with said selected procedural component.

12. The system according to claim 11, wherein said procedural debugger and said object-oriented method operate in different processes.

13. The system according to claim 11, wherein said procedural debugger and said object-oriented method operate in different namespaces.

14. The system according to claim 11, wherein said procedural debugger and said object-oriented method operate in different software products.

15. The system according to claim 10, wherein said means for executing said second object-oriented method further comprises means for executing said second object-oriented method under control of an object-oriented debugger.

16. The system according to claim 15, wherein said interactive test facility and said object-oriented debugger are written in different programming languages.

17. A method for providing synchronous execution between objects written in an object-oriented programming language and business logic written in a procedural programming language while executing under control of an interactive test facility for debugging purposes, said method comprising the steps of:

selecting, by a user of said interactive test facility, an event from a graphical user interface while executing a first object-oriented method written in said object-oriented language, wherein said event is operably associated with a selected one of one or more procedural components written in said procedural programming language, wherein said selected procedural component contains an invocation of a second object-oriented method written in said object-oriented programming language; and enabling synchronous execution of said selected procedural component, under control of a procedural debugger of said interactive test facility, and said second object-oriented method.

18. The method according to claim 17, wherein said step of enabling synchronous execution further comprises the steps of:

first transferring control from said first object-oriented method to said selected procedural component, responsive to said selecting step;

executing said selected procedural component under control of said procedural debugger, responsive to said step of first transferring control;

next transferring control from said procedural debugger to said second object-oriented method upon encountering said invocation during execution of said selected procedural component;

executing said second object-oriented method, responsive to said step of next transferring control; and returning control from said second object-oriented method to said procedural debugger upon completion of said execution of said second object-oriented method.

19. The method according to claim 18, further comprising the steps of:

performing a first synchronization of data values prior to operation of said transferring control step, thereby enabling data values changed by said step of executing said selected procedural component to be shared with said second object-oriented method; and performing a second synchronization of data values prior to operation of said returning control step, thereby enabling data values changed by said step of executing said second object-oriented method to be shared with said selected procedural component.

20. The method according to claim 19, wherein said procedural debugger and said object-oriented method operate in different processes.

21. The method according to claim 19, wherein said procedural debugger and said object-oriented method operate in different namespaces.

22. The method according to claim 19, wherein said procedural debugger and said object-oriented method operate in different software products.

23. The method according to claim 18, wherein said step of executing said second object-oriented method further comprises the step of executing said second object-oriented method under control of an object-oriented debugger.

24. The method according to claim 23, wherein said interactive test facility and said object-oriented debugger are written in different programming languages.

* * * * *